(12) United States Patent
Freedman

(10) Patent No.: US 7,996,531 B2
(45) Date of Patent: Aug. 9, 2011

(54) CONTENT DELIVERY NETWORK MAP GENERATION USING PASSIVE MEASUREMENT DATA

(75) Inventor: Avraham T. Freedman, Elkins Park, PA (US)

(73) Assignee: Akamai Technologies, Inc., Cambridge, MA (US)

( * ) Notice: Subject to any disclaimer, the term of this patent is extended or adjusted under 35 U.S.C. 154(b) by 382 days.

(21) Appl. No.: 11/362,667

(22) Filed: Feb. 27, 2006

(65) Prior Publication Data

US 2006/0143293 A1   Jun. 29, 2006

Related U.S. Application Data

(62) Division of application No. 10/163,969, filed on Jun. 6, 2002, now Pat. No. 7,007,089.

(60) Provisional application No. 60/296,375, filed on Jun. 6, 2001.

(51) Int. Cl.
G06F 15/173 (2006.01)
(52) U.S. Cl. ......... 709/225; 709/223; 709/226; 709/227
(58) Field of Classification Search .................. 709/203, 709/231, 227, 229, 223, 225, 226
See application file for complete search history.

(56) References Cited

U.S. PATENT DOCUMENTS

| | | | |
|---|---|---|---|
| 5,719,942 A | 2/1998 | Aldred et al. | |
| 5,991,809 A | 11/1999 | Kriegsman | |
| 6,003,030 A | 12/1999 | Kenner et al. | |
| 6,108,703 A | 8/2000 | Leighton et al. | |
| 6,119,143 A | 9/2000 | Dias et al. | |
| 6,185,598 B1 | 2/2001 | Farber et al. | |
| 6,405,252 B1 | 6/2002 | Gupta et al. | |
| 6,484,143 B1 | 11/2002 | Swildens et al. | |
| 6,502,125 B1 | 12/2002 | Kenner et al. | |
| 6,553,413 B1 | 4/2003 | Lewin et al. | |
| 6,597,684 B1 | 7/2003 | Gulati et al. | |
| 6,665,706 B2 | 12/2003 | Kenner et al. | |
| 6,751,673 B2 | 6/2004 | Shaw | |
| 6,771,594 B1 * | 8/2004 | Upadrasta | 370/228 |
| 6,807,156 B1 * | 10/2004 | Veres et al. | 370/252 |
| 6,850,984 B1 * | 2/2005 | Kalkunte et al. | 709/229 |
| 7,299,291 B1 * | 11/2007 | Shaw | 709/231 |
| 2002/0078233 A1 | 6/2002 | Biliris et al. | |
| 2003/0237016 A1 | 12/2003 | Johnson et al. | |

* cited by examiner

*Primary Examiner* — Kenny S Lin
(74) *Attorney, Agent, or Firm* — David H. Judson

(57) ABSTRACT

A routing method operative in a content delivery network (CDN) where the CDN includes a request routing mechanism for routing clients to subsets of edge servers within the CDN. According to the routing method, TCP connection data statistics are collected are edge servers located within a CDN region. The TCP connection data statistics are collected as connections are established between requesting clients and the CDN region and requests are serviced by those edge servers. Periodically, e.g., daily, the connection data statistics are provided from the edge servers in a region back to the request routing mechanism. The TCP connection data statistics are then used by the request routing mechanism in subsequent routing decisions and, in particular, in the map generation processes. Thus, for example, the TCP connection data may be used to determine whether a given quality of service is being obtained by routing requesting clients to the CDN region. If not, the request routing mechanism generates a map that directs requesting clients away from the CDN region for a given time period or until the quality of service improves.

9 Claims, 3 Drawing Sheets

CONTENT DELIVERY NETWORK MAP GENERATION USING PASSIVE MEASUREMENT DATA

This application is a division of U.S. Ser. No. 10/163,969, filed Jun. 6, 2002 now U.S. Pat. No. 7,007,089, which application was based on Provisional Application Ser. No. 60/296,375, filed Jun. 6, 2001.

BACKGROUND OF THE INVENTION

1. Technical Field

The present invention relates generally to high-performance, fault-tolerant HTTP, streaming media and applications delivery in a content delivery network (CDN).

2. Description of the Related Art

It is well-known to deliver HTTP and streaming media using a content delivery network (CDN). A CDN is a network of geographically distributed content delivery nodes that are arranged for efficient delivery of digital content (e.g., Web content, streaming media and applications) on behalf of third party content providers. A request from a requesting end user for given content is directed to a "best" replica, where "best" usually means that the item is served to the client quickly compared to the time it would take to fetch it from the content provider origin server. An entity that provides a CDN is sometimes referred to as a content delivery network service provider or CDNSP.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A commercial CDN service that provides web content and media streaming is provided by Akamai Technologies, Inc. of Cambridge, Mass.

A typical CDN edge server includes commodity hardware, an operating system such as Linux, a TCP/IP connection manager, a cache, and one or more applications that provide various functions such as cache management, logging, and other control routines that facilitate the content delivery techniques implemented by the CDNSP at the server. In an illustrative case, the operating system kernel is Linux-based and tracks and provides access to per session and aggregate TCP/IP information, such as per-system number of packets, bytes sent and received, number of retransmits, and the like. The TCP connection information that is available from monitoring the operating system kernel has not been fully mined for its potential value, especially to CDN service providers. TCP stream state data, however, generates implicit information about the state of the network. Thus, for example, packet retransmissions can indicate congestion within the network. An estimated round-trip-time (RTT) derived from TCP connection information indicates latency to a remote host. Early FIN message receipt can indicate a dropped connection. A lower window size than usual can indicate instability in topological path. Each session's overall and smaller time-scale throughput is one of the best measures of actual end-user performance.

It would be desirable to be able to use edge server CDN statistics in other CDN control processes.

BRIEF SUMMARY OF THE INVENTION

According to the invention, TCP connection information resulting from prior CDN mapping decisions to a given edge server region (or to a given edge server therein) is logged, aggregated, and then used to improve subsequent routing of client requests to servers in a content delivery network.

More generally, it is an object of the invention to use passive measurement data to facilitate the generation or evaluation of client-to-server request routing maps in a content delivery network. Passive measurement data is logged at CDN edge server machines, preferably on a per-connection basis or a per HTTP connection basis.

It is another more specific object of the invention to collect TCP connection information from CDN edge servers to allow network performance to be correlated with particular hosts or address blocks, allowing for improved maps to be generated during the CDN map generation process.

According to the present invention, TCP statistics data from remote machines is logged and delivered back to a central location and used by a CDN to generate request routing maps, such as an IP block to CDN region map. This enables the CDN map to be modified as a function of passive measurement data that reflects how well the CDN request routing mechanism actually mapped prior web requests.

The present invention generally describes a routing method operative in a content delivery network having a request routing mechanism for routing clients to edge servers. At a given edge server located within a CDN region, data associated with one or more connections that have been established between requesting clients and the CDN region is collected. That data is then provided back to the request routing mechanism, where it is used is a subsequent routing decision. Preferably the data is per HTTP connection data collection from a configurable percentage of client requests that are serviced by the given edge server. This TCP connection data preferably is aggregated with similar data from other edge servers in the CDN region before being passed back to the CDN request routing mechanism. This enables the request routing mechanism to make new maps based on an accurate view as to how well given connections are being serviced within the CDN region.

In a more detailed, yet illustrative embodiment, a routing method is operative in a content delivery network (CDN) where the CDN includes a request routing mechanism for routing clients to subsets of edge servers within the CDN. According to the routing method, TCP connection data statistics are collected are edge servers located within a CDN region comprising a subset of edge servers. The TCP connection data statistics are collected as connections are established between requesting clients and the CDN region and requests are serviced by those edge servers. Either in real-time or delayed (e.g., hourly or daily), the detailed and/or summarized connection data statistics are provided from the edge servers in a region back to the request routing mechanism. The TCP connection data statistics are then used by the request routing mechanism in subsequent routing decisions and, in particular, in the map generation processes. Thus, for example, the TCP connection data may be used to determine whether a given quality of service is being obtained by routing requesting clients to the CDN region. If not, the request routing mechanism generates a map that directs requesting clients away from the CDN region for a given time period or until the quality of service improves.

The foregoing has outlined some of the more pertinent objects and features of the present invention. These objects should be construed to be merely illustrative of some of the more prominent features and applications of the invention.

BRIEF DESCRIPTION OF THE DRAWINGS

For a more complete understanding of the present invention and the advantages thereof, reference should be made to the following Detailed Description taken in connection with the accompanying drawings, in which.

DESCRIPTION OF THE PREFERRED EMBODIMENT

Figure 1:
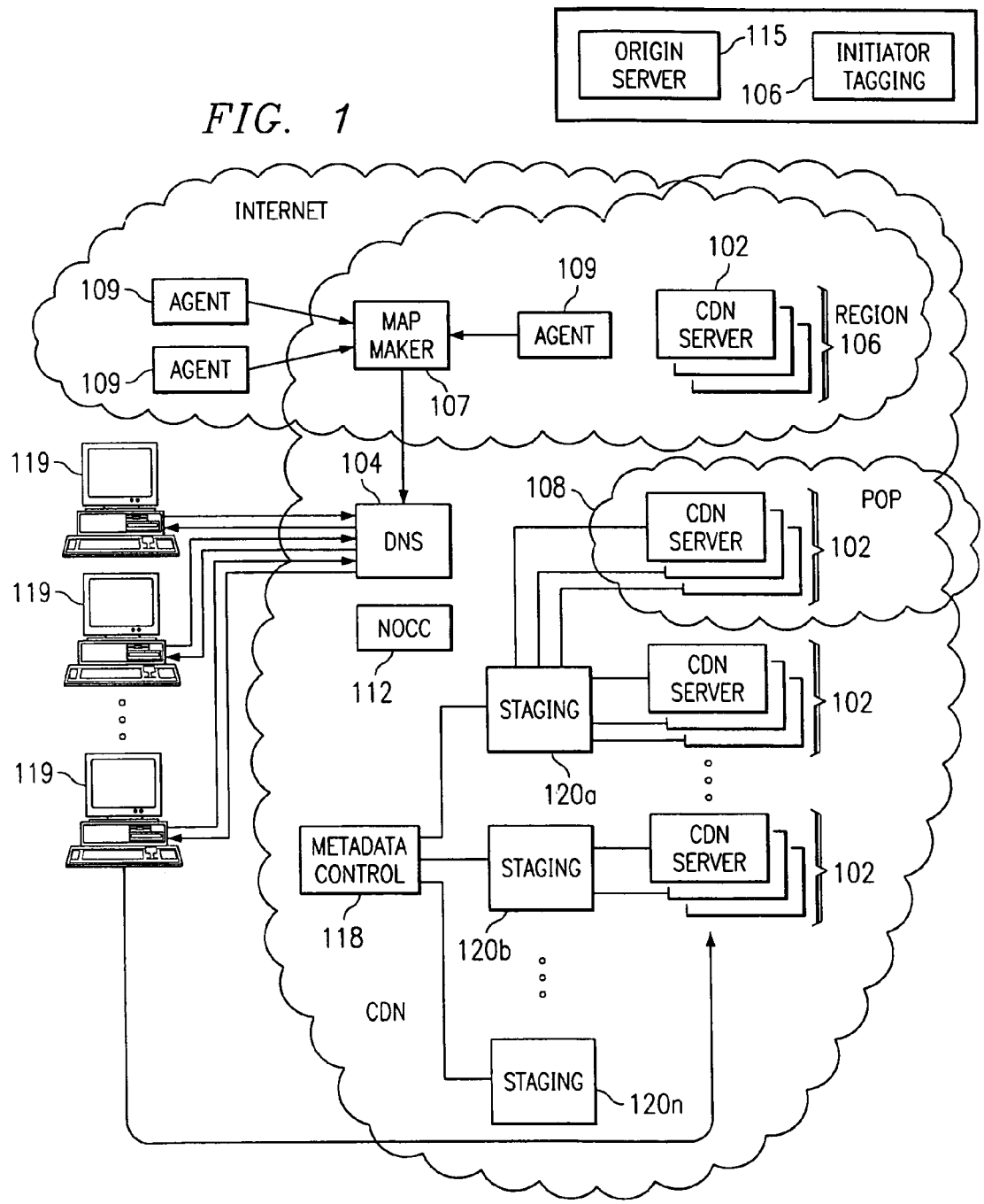
FIG. 1 is a diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. A CDN service provider (CDNSP) may organize sets of surrogate origin servers as a "region." In this type of arrangement, a CDN region 106 typically comprises a set of one or more content servers that share a common backend, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edges" of the Internet. The CDN typically also includes network agents 109 that monitor the network as well as the server loads. These network agents are typically co-located at third party data centers or other locations. Map maker software 107 receives data generated from the network agents and periodically creates maps that dynamically associate IP addresses (e.g., the IP addresses of client-side local name servers) with the CDN regions.

In one service offering, available from Akamai Technologies, Inc. of Cambridge, Mass., content is marked for delivery from the CDN using a content migrator or rewrite tool 106 operated, for example, at a participating content provider server. Tool 106 rewrites embedded object URLs to point to the CDNSP domain. A request for CDN-enabled content is resolved through a CDNSP-managed DNS to identify a "best" region, and then to identify an edge server within the region that is not overloaded and that is likely to host the requested content. An illustrative request routing technique is described in U.S. Pat. No. 6,108,703, which is incorporated by reference. Instead of using content provider-side migration (e.g., using the tool 106), a participating content provider may simply direct the CDNSP to serve an entire domain (or subdomain) by a DNS directive (e.g., a CNAME). In such case, the CDNSP may provide object-specific metadata to the CDN content servers to determine how the CDN content servers will handle a request for an object being served by the CDN. Metadata, as used herein, refers to the set of control options and parameters for an object (e.g., coherence information, origin server identity information, load balancing information, customer code, other control codes, etc.), and such information may be provided to the CDN content servers via a configuration file, in HTTP headers, or in other ways. An object URL that is served from the CDN in this manner need not be modified by the content provider. When a request for the object is made, for example, by having an end user navigate to a site and select the URL, a customer's DNS system directs the name query (for a domain in the URL) to the CDNSP DNS request routing mechanism. Once an edge server is identified, the browser passes the object request to the server, which applies the metadata supplied from a configuration file or HTTP response headers to determine how the object will be handled.

The CDNSP may operate a metadata transmission system 116 comprising a set of one or more servers to enable metadata to be provided to the CDNSP content servers. The system 116 may comprise at least one control server 118, and one or more staging servers 120a-n, each of which is typically an HTTP server (e.g., Apache). Metadata is provided to the control server 118 by the CDNSP or the content provider (e.g., using a secure extranet application) and periodically delivered to the staging servers 120a-n. The staging servers deliver the metadata to the CDN content servers as necessary.

Figure 2:
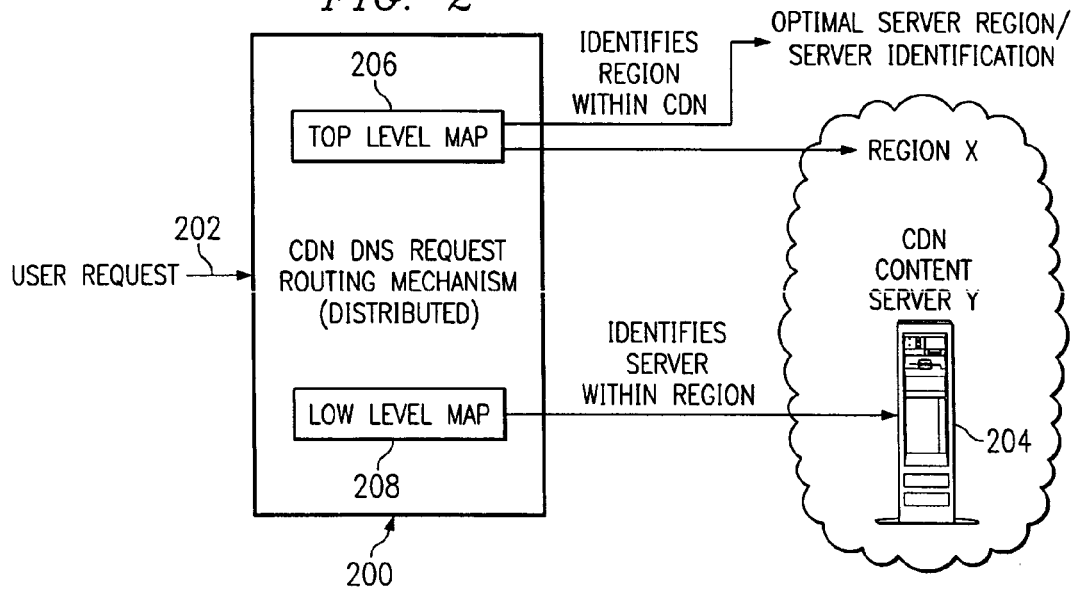
FIG. 2 is a simplified diagram of a two level request routing mechanism used in the content delivery network of FIG. 1.

As illustrated in FIG. 2, a dynamic DNS system 200 such as described generally above directs each user web request 202 to the optimal server 204 for content delivery. In one approach, a "top level" map 206 directs a specific request to one of a given number of server regions, while a "low level" map 208 further directs the request to a given server within a region. Thus, for example, the top level map 206 may associate each Internet IP address block with a CDN server region that can deliver content to clients in that block most quickly. To prepare for generating this map, mapping agents (e.g., one per CDN server region) may collect the following information: (a) IP blocks (a list of IP address blocks currently in use in the Internet), (b) load (per-IP block measurements of the amount of web load currently being handled by the CDN, (c) communication costs (e.g., a table listing the measured communication cost for each {IP block, CDN server region} pair, and (d) capacity (e.g., an aggregate server and network capacity of each CDN server region). A combination of different methods may be used to put together the list of IP blocks representing all of the leaf networks (e.g., endpoint LAN's on the global Internet): BGP peering, harvesting information from network registration databases (e.g., RIPE, APNIC and ARIN), and random traceroutes into very large blocks (e.g., UUNET). The load on the CDN generated by each IP block may be determined by gathering and aggregating measurements from the CDN content servers. One or more different communication costs may be used to determine the cost of communication between an IP block and a CDN server region: network health of server region (e.g., a binary metric indicating that the region is up or down), ASPATH length between the block and the server region (e.g., as supplied by BGP), round trip time (RTT) between the region's mapping agent and a given point in the IP block, packet loss rate between the region's mapping agent and the given point in the IP block, geographic distance, and perhaps others. These metrics may be combined into a single cost metric for each IP block, server region pair, with the priority, or weighting, of each individual metric set to be proportional to its position on the list. Two types of capacity measurement may be made: total server capacity in each region and physical network capacity in each region. The server capacity is determined, for example, from the number of servers currently up in a region. Physical network capacity is determined, for example, with packet pair measurements. Region capacity may be calculated as a given function (e.g., the minimum) of these two measurements.

As noted above, the top level map 206 maps each IP block to an optimal CDN server region. One technique for generating the top level map involves identifying a number of candidate regions for each IP block (e.g., based on the {IP block, server region} communication costs), generating a bipartite graph using all of the measured and collected network information (e.g., with one side of the graph representing each of the IP blocks and the other side representing CDN server regions), and then running a min-cost flow algorithm on the graph. Each IP block node is labeled with its measured load, which is treated as the "flow" coming from that node. Running the algorithm results in an optimal assignment of IP block load to server regions. This assignment is the top level map, which is generated periodically and then delivered to the dynamic DNS request routing mechanism. The above map generation process is merely exemplary and is not meant to limit the present invention of course.

Figure 3:
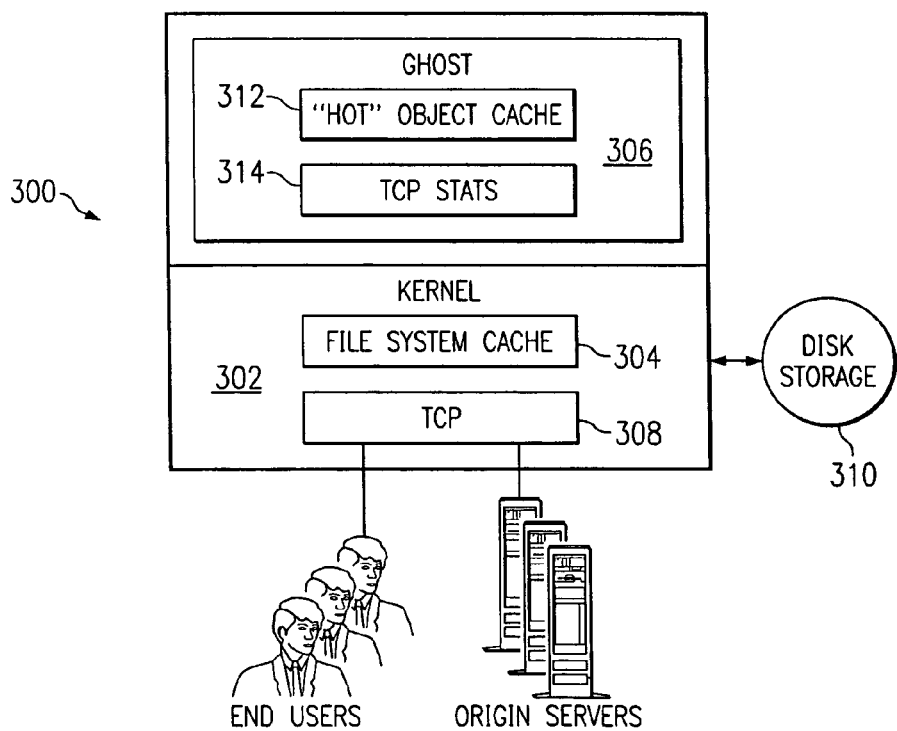
FIG. 3 is a simplified diagram of a typical CDN edge server that has been modified to include the TCP statistics monitoring process according to the present invention.

FIG. 3 illustrates a typical machine configuration for a CDN content server. Typically, the content server 300 is a Pentium-based caching appliance running an operating system kernel 302 (e.g., based on Linux), a file system cache 304, CDN control software 306, TCP connection manager 308, and disk storage 310. CDN control software 306, among other things, is useful to create an object cache 312 for popular objects being served by the CDN. In operation, the content server 300 receives end user requests for http content, determines whether the requested object is present in the hot object cache or the disk storage, serves the requested object (if it is present) via http, or it establishes a connection to another content server or an origin server to attempt to retrieve the requested object upon a cache miss. According to the invention, the CDN software 306 also includes a logging routine, called TCPStats 314, which in an illustrative embodiment logs a record for every TCP connection made to/by the machine on which this software is running in addition to connections made to/by the CDN software process itself. Generalizing, the TCPStats process logs arbitrary pieces of information about a TCP connection.

Figure 4:
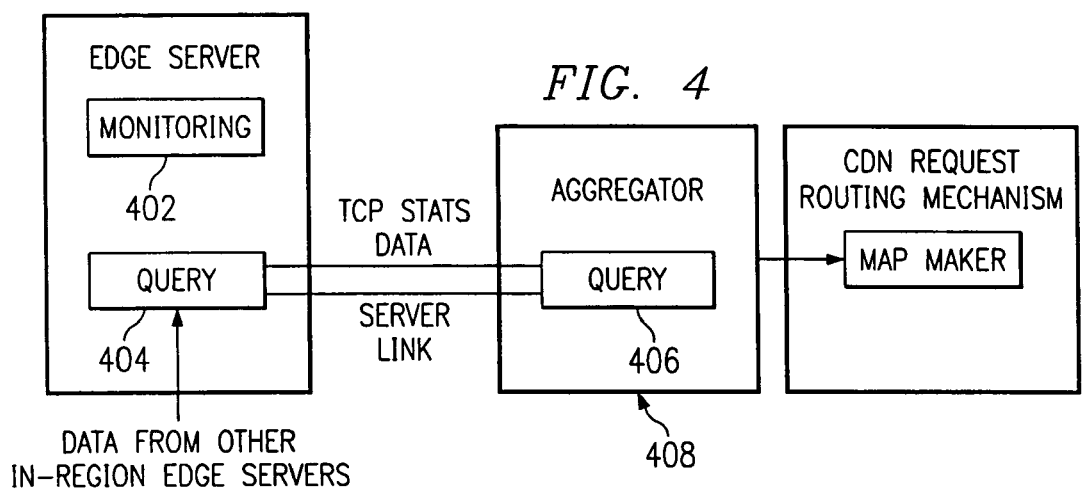
FIG. 4 is an simplified diagram of how TCP data is logged, aggregated and then delivered to a CDN request routing mechanism in an illustrative embodiment of the present invention.

In an illustrative embodiment as shown in FIG. 4, each edge server 400 in a region runs one or more monitoring processes 402, and an instance of a query process 404. A monitoring process monitors the health of the local machine and the network to which it is connected; another monitoring process monitors the hits and bytes served by the CDN software running on the machine. The TCP statistics monitoring is preferably performed by one of these monitoring processes 402. Generally, the TCP statistics data is collected by that process and made available to the local instance of the query process 404. Periodically, a central instance of the query process 406 running on an aggregator machine 408 (typically somewhere else in the network) makes a request to the local instance of the query process. There may be a hierarchy of aggregators, depending on the size and scope of the network deployment. When requested, the query process collects tables of data from machines in the same region (typically within a given data center) and relays them to the aggregator machine 408, which accumulates and stores the data. According to the invention, the TCP statistics data is then supplied to the CDN request routing mechanism 410 to facilitate future mapping decisions. Data preferably is delivered between machines over a secure connection, which can be implemented with known software tools.

Generalizing, TCPStats data aggregated from the CDN content servers is used in subsequent revisions to a given map, e.g., the IP block to CDN region map. In particular, the TCPStats data provides an additional refinement to the map making process to provide a map that includes passive measurement data about how a given number of individual requests were previously routed by the CDN request routing mechanism. This feedback mechanism enables a more accurate map to be generated in the future based, in part, on an after-the-fact evaluation of how well earlier CDN mapping decisions routed prior requests, preferably on an aggregate basis, as evidenced by the actual TCP statistics logged at the CDN content servers within a given region. If, for example, those statistics illustrate that prior mapping decisions with respect to a given region did not provide a sufficient quality of service, then the map making process can be modified appropriately.

As a specific example, assume that TCPStats data is aggregated on a per machine and per region basis. This data enables a given process to monitor the health of the region itself, especially if the data is used in conjunction with other historical data. The TCPStats data provides detailed information about the quality of the connections to the various machines in the region. If that data establishes that connections to the region (in general, or for a specific IP block mapped to the region) are receiving a quality of service below a given threshold, the map making algorithm may then bias requests away from that region for a given time period or until the connectivity data shows improvement. As another example, assume that the map generation process identifies two (2) regions that appear equally good for handling a given request. In such case, the TCPStats data can be used as a tie-breaker. In addition, the TCPStats data may be used to provide an indication of how well the mapping algorithm performed over a given time period (e.g., daily). Of course, the above examples are merely exemplary and should not be taken to limit the scope of the present invention, which should be broadly construed to cover the use of the TCP Stats passive measurement data to facilitate the generation or evaluation of client-to-server request routing maps in a content delivery network.

The TCP/IP protocol's fully-reliable transport model and intricate congestion control mechanisms allow a CDNSP to gather a great deal of useful information. The following is representative. Thus, on a per client×server×URL basis, the CDNSP can determine, for example: the number of bytes transmitted, the duration of connection (including the duration of each phase of the connection), loss seen in the connection, latency between client and server as measured and used, variance in latency seen between the client and server, the maximum/average measurements of the size of the network connection between the client and server, overall and instantaneous throughput, window size and the like. In an illustrative embodiment, TCP statistics across three (3) axes (client, server, and URL) are collected by the TCPStats process and is used to provide a profiling tool for every connection.

More specifically, TCP statistics entries may include one or more of the following fields (familarity with the TCP/IP protocol is assumed):

- Time initial SYN packet was received (sent): this is the time the first packet on the connection was received (if the connection came from a remote client) or sent (if a connection is being established to a remote server). The time is expressed in sec.msec, where sec is number of seconds since a Unix epoch and msec is the number of milliseconds since the beginning of that second. All other times preferably are offsets from this time.
- Local IP address:port: the IP address of the machine that the CDN software runs on, which is specified in the 4 byte dotted quad notation (w.x.y.z) followed by a colon (:) and the local IP port number.
- Direction: a single character identifier that tells if the connection was made local to remote machine ('>') or remote to local machine ('<').
- Remote IP address:port: IP address of the remote machine in 4 byte format, a colon, and the remote IP port number.
- Number of packets received.
- Number of packets sent.
- Number of duplicate packets sent (retransmits).
- Total bytes sent.
- Total bytes received.
- Total duplicates bytes sent and received.
- Max Smooth Round Trip Time (SRTT) during the connection (in msec).
- Min Smooth Round Trip Time during the connection.
- Log of RTT estimates obtained and/or summary statistics.
- Log of calculated SRTT values and/or summary statistics.
- Time spent in each phase of the states associated with the TCP connection:
  - From begin until ESTABLISHED: the elapsed time from the receipt of the initial SYN from the client (the second field in the log entry) until the ACK of the initial SYN-ACK is received by the CDN software process. In the case of a forward connection, this is the time from SYN send until the SYN-ACK was received by the remote server. This and all other delta times below are expressed as msec, the number of milliseconds from the connection begin time (SYN time, as described above).
  - Time from begin until FIN_WAIT: The elapsed time between when the connection began and when the connection got into the FIN_WAIT state (zero if not applicable).
  - Time from begin until FIN_WAIT1 state (zero if not applicable).
  - Time from begin until FIN_WAIT2 state (zero if not applicable).
  - Time from begin until CLOSING state (zero if not applicable).
  - Time from begin until the last ACK was received (zero if not applicable).
  - Time from begin until WAIT state (zero if not applicable).
- # Duplicate ACK's sent
- Max window size (in bytes)
- Number of Times the RTO timer expired
- Delayed ACK count
- Average window size
- Average IP TTL observed TCPStats data is generated by any convenient mechanism. The Linux operating system kernel provides some of this data directly. In particular, the kernel keeps track and provides access to aggregate information including per-system number of packets, bytes sent and received, and number of retransmits, among other things. To facilitate TCP statistics collection, the operating system kernel preferably is modified to provide access to per-connection statistics. The modified code keeps track of that information per-connection (in the kernel) and provides an interface for an application to mark a connection as interesting and to get its connection information when the connection is complete. Preferably, the application also implements per-HTTP connection statistics. This requires marking a TCP connection with the beginning and end points of an HTTP request. The kernel keeps track of bytes sent/received for the duration of the request and provides statistics to the application upon request. This allows a more accurate estimation of per-connection bandwidth than is possible with per-connection statistics because many TCP connections are allowed to stay open (in an HTTP persistent connection state) after the HTTP response has been sent, in the hopes another request will reuse the established connection. In contrast, just looking at bytes sent/total time is not as accurate a measure, as the per connection time will reduce the apparent bandwidth by a significant amount. In an illustrative embodiment, these statistics are provided by the kernel to user space preferably through a device file interface, which is a standard way for the kernel to communicate with an application. The statistics themselves preferably are kept in a circular memory buffer so that the kernel does not run out of memory even if the logging application lags behind. Preferably, the application is designed to read all available statistics out of the kernel at a configurable interval (e.g., once per second) and to write statistics into a log for a configurable fraction of all requests (e.g., 1%). This allows the application to obtain a statistical sample of all of traffic served from the machine. Preferably, the application marks when it is sending and receiving data to get better bandwidth measurements. More information about the TCP/IP protocol and the Linux operating system kernel can be obtained from the following resources: Stevens, TCP/IP Illustrated Volume 1: The Protocols. Addison-Wesley, and Beck, et al., Linux Kernel Internals, Second Edition. Addison-Wesley.

Other techniques for collecting the TCP statistics information may also be used. Thus, for example, the CDN edge server may be provisioned with a tcpdump process and a filter to look at the TCP packet headers and collect information from them (such as retransmission, and the like). This is a less invasive approach than modifying the kernel, but it does creates additional load onto the server. In this embodiment, the filter needs to keep track of state such as open connections and also needs to deduce retransmissions, and the like, from the packets it sees going across the wire. Alternatively, the CDN server process can simply gather information about the TCP state of open sockets and log such data along with other connection data. The preferred approach, as described above, is instrument the kernel to stream TCP state information to a separate user-space process that collects it, processes it, and then feeds the data back to the request routing mechanism as appropriate.

Variants

In an alternate embodiment, the CDNSP can cause TCP statistics data to be generated for a given region (or to a particular prefix), irrespective of whether the region is suspected of being good or bad-performing. In this embodiment, the system generates a random mapping of a given request, which causes measurements to be made at the respective region so that performance of the region can be evaluated. This provides a network monitoring method.

The CDNSP may perform given filtering in an edge region to analyze the TCP statistics and look for unusual performance issues on, for example, a per CIDR block, per prefix, per AS, or other basis. The results of such filtering may then be fed back to generate control commands to the request routing mechanism (e.g., "stop mapping Sprint (AS1239)").

The CDNSP may also obtain TCP statistics from a customer origin server and use such information to find a best customer region.

Of course, one of ordinary skill in the art will also appreciate that the techniques of monitoring connection data and using that information to influence a routing decision as described herein may be extended beyond the use with CDN request routing mechanisms to general IP traffic routing mechanisms.

Having described my invention, what I claim is as follows:

1. A method operative in a content delivery network request routing mechanism that generates maps for use in directing client requests to subsets of CDN servers, comprising:
    receiving TCP connection data statistics from one or more subsets of CDN servers; and
    using the TCP connection data statistics to modify a client-to-CDN server mapping from a first CDN server to a second CDN server;
    wherein the step of using the TCP connection data statistics includes analyzing the TCP connection data statistics on one of: a per CIDR block basis, a per prefix basis, or a per autonomous system (AS) basis.

2. The method as described in claim 1 wherein the TCP connection data statistics are generated on a per connection basis.

3. The method as described in claim 2 wherein the TCP connection data statistics are generated on a per HTTP connection basis.

4. The method as described in claim 1 wherein the request routing mechanism includes a map that associates Internet Protocol (IP) address blocks to subsets of CDN servers and that is used to respond to DNS queries.

5. The method as described in claim 4 further including the step of modifying the map as a function of the TCP connection data statistics.

6. The method as described in claim 1 wherein the TCP connection data statistics are collected on a per edge server basis.

7. The method as described in claim 1 wherein the TCP connection data statistics are collected on a per requesting client basis.

8. The method as described in claim 1 wherein the TCP connection data statistics are collected on a per URL basis.

9. Apparatus for use in a content delivery network request routing mechanism that generates maps for use in directing client requests to subsets of CDN servers, comprising:
    a processor; and
    computer memory holding computer program instructions that when executed by the processor perform a method comprising:
    receiving TCP connection data statistics from one or more subsets of CDN servers; and
    using the TCP connection data statistics to modify a client-to-CDN server mapping from a first CDN server to a second CDN server;
    wherein the using step analyzes the TCP connection data statistics on one of: a per CIDR block basis, a per prefix basis, or a per autonomous system (AS) basis.

* * * * *